United States Patent [19]

Engler et al.

[11] Patent Number: 4,940,599

[45] Date of Patent: Jul. 10, 1990

[54] METHOD OF PRODUCING FRESH MEAT IN WHICH SUBSTANTIAL MOISTURE LOSS DURING PRODUCTION IS REDUCED

[76] Inventors: Sid V. Engler, 255 Brimley Road, Scarborough, Ontario, Canada, M1M 3J2; George Cobb, 307 Bishop Street North, Cambridge, Ontario, Canada, N3H 2K2

[21] Appl. No.: 388,438

[22] Filed: Aug. 2, 1989

[51] Int. Cl.$^5$ ................................................ A23L 1/00
[52] U.S. Cl. ......................................... 426/524; 62/64
[58] Field of Search .................... 426/68, 524; 62/64, 62/373

[56] References Cited

U.S. PATENT DOCUMENTS 1,969,832  8/1934  Beard .................................... 426/68
2,065,358  12/1936  Zarotschenzeff ....................... 62/64

*Primary Examiner*—George Yeung
*Attorney, Agent, or Firm*—Joseph A. Day

[57] ABSTRACT

A method of producing fresh meat is disclosed, in which substantial moisture loss during production is effectively reduced. The method comprises the steps of applying liquid to the surface of a carcass; subjecting the carcass to a supercold environment for a period of time short enough to substantially prevent freezing of the outermost layers of the flesh of the carcass, but long enough to allow for formation of an ice layer around the carcass. Once the ice layer is formed, the carcass is passed into refrigeration chamber for further cooling. The carcass is kept in the refrigeration chamber for a period of time long enough to lower the temperature of the flesh to a point where substantial deterioration of the flesh is prevented, but short enough to prevent freezing of the flesh.

16 Claims, No Drawings

METHOD OF PRODUCING FRESH MEAT IN WHICH SUBSTANTIAL MOISTURE LOSS DURING PRODUCTION IS REDUCED

BACKGROUND OF THE INVENTION

This invention relates generally to processing of carcasses and more particularly to a method of processing of carcasses in which substantial moisture loss is reduced.

PRIOR ART

It is well known that during cooling of carcasses from the kill temperature to a temperature at which deterioration of the meat is substantially prevented, a fairly large volume of moisture may be lost from the carcasses. This moisture loss results in a loss of quality in the end product, in a lower end weight of the product and a consequent loss of money.

It is therefore desirable to prevent excess moisture loss from carcasses as they cool to a temperature where deterioration of the meat is substantially prevented. The most common manner used in the prior art for accomplishing this end, is a process known as crustfreezing. In this process the outermost layer of the flesh is frozen, thus preventing a substantial amount of water from being lost from the carcass. U.S. Pat. #4,028,774 granted to Allan et al in 1977, discloses freezing the outermost layer of the flesh on carcasses to prevent substantial moisture loss. The freezing of the outermost layer of flesh is achieved by blowing cold air over the carcasses. U.S. Pat. #4,325,221, granted to Grewar in 1982, discloses a method of freezing the outermost layer of flesh on a carcass by spraying a cryogenic fluid directly onto the carcass. U.S. Pat. #4,367,630, granted to Bernard et al in 1983, discloses a method of crust-freezing by passing the carcasses through a tank of cryogenic fluid.

The main problem exhibited by the crust-freezing process is that it can result in spoilage of the appearance of the outermost layers of the flesh. This is of particular importance in products such as poultry. Other methods of preventing moisture loss have therefore been proposed, including the method disclosed by Bourdel in U.S. Pat. #4,810,515, granted in 1989. The Bourdel patent teaches the moving of carcasses on a conveyor type system through a refrigeration chamber. The carcasses may be sprayed with a fine mist of salt water before they enter the refrigeration chamber. Once inside the chamber the carcasses are sprayed with a fine mist of sterilized water at various intervals in the cooling process. According to column 5, line 51–59 of the patent, the water evaporates from the surface of the carcasses and creates a high humidity level around the carcasses, thereby preventing excess moisture loss from the meat. This type of process tends to be fairly expensive because of the quantity of equipment that has to be installed in the refrigeration chamber to maintain the high humidity levels, and because of the large volume of water that is required.

SUMMARY OF THE INVENTION

The present invention is a method of processing a carcass to substantially reduce moisture loss during processing in which the carcass is rapidly subjected to a supercold atmosphere for a brief period of time. Either immediately before or immediately after subjecting the carcass to this supercold atmosphere, the carcass is sprayed with a fine mist of water. The water freezes on the surface of the carcass and forms a thin ice layer around the carcass. The thin ice layer substantially reduces the amount of moisture lost from the carcass as it cools. The supercold atmosphere may be in the form of a bath of cryogenic fluid, a cryogenic fluid spray or any other suitable manner of causing rapid cooling.

The carcass may then be passed through a refrigeration chamber to lower the temperature of the meat to a point that deterioration of the meat is substantially prevented. The resulting end product of the process is fresh meat, but the process could be used in the initial stages of preparing frozen meat products.

DETAILED DESCRIPTION OF THE INVENTION

The present invention is described in connection with poultry, but is equally applicable to other types of meat.

Eviscerated poultry carcasses are passed through a bath containing a cryogenic fluid, such as liquid nitrogen, for a 5–30 second period. This length of time is sufficient to supercool the outermost layer of the flesh without causing crust-freezing. Either immediately before or immediately after passing the carcasses through the cryogenic bath, the carcasses are sprayed with a fine mist of water. The water freezes to form a very thin surface layer of ice around the carcass. The ice layer is approximately equal to 1% of the weight of the carcass.

During the ice formation process the carcasses receive some refrigeration which tends to reduce the total processing time. The carcassess are then subjected to a 10–15 minute refrigeration time in a conventional refrigeration chamber. During this time the surface layer of ice slowly melts and the carcasses leave the refrigeration chamber with almost no ice layer remaining. The carcasses exit the chamber at a temperature of between 28° F. and 40° F., which temperature is sufficient to prevent deterioration of the meat. At this temperature the poultry is in the fresh state.

This process may be used in the initial stages of the preparation of frozen meat products. In that instance, instead of forming the ice layer and then refrigerating the carcass for a 10–15 minute period, the refrigeration period can be extended for a length of time which allows the meat to freeze. If it is undesirable to have the ice layer maintained around the carcass, the temperature for the first 10–15 minutes of the proces can be maintained at such a level as to cool the carcass but allow the ice layer to melt. Thereafter the temperature may be lowered to the point that the meat will freeze. It is the initial drop in temperature from the kill temperature of about 80° F. to about 32° F. that results in the majority of the moisture loss from a carcass.

Variation in the present invention will be obvious to those skilled in the art, and any such obvious variations are contemplated to fall within the scope of the present invention.

The embodiments of the invention in which an exclusive property or privilege is claimed are defined as follows:

1. A method of chilling a carcass in which moisture loss during chilling is substantially reduced; said method comprising the steps of:
    applying liquid to the carcass;
    subjecting the carcass to a supercold environment, so that a thin ice layer forms around the carcass; said carcass being subjected to said environment for a period of time short enough to substantially prevent freezing of the outermost layers of the flesh of the carcass, but long enough to allow for formation of said ice layer;
    cooling the ice-layer-protected carcass for a further period of time long enough to lower the temperature of the flesh to a point where substantial deterioration of the flesh is prevented, but short enough to prevent freezing of the flesh.

2. A method of chilling a carcass as defined in claim 1 wherein the resultant final temperature of the flesh is between 34° F. and 40° F.

3. A method of chilling a carcass as defined in claim 1 wherein the resultant final temperature of the flesh is between 33° F. and 37° F.

4. A method of chilling a carcass as defined in claim 1, 2 or 3 wherein the resultant end product is in a fresh state.

5. A method of chilling a carcass as defined in claim 1 wherein the carcass is subjected to the supercold environment for a 5-30 second period.

6. A method of chilling a carcass as defined in claim 5 wherein the supercold environment is a cryogenic fluid.

7. A method of chilling a carcass as defined in claim 6 wherein the cryogenic fluid is sprayed onto the carcass.

8. A method of chilling a carcass as defined in claim 6 wherein the carcass is immersed in the cryogenic fluid.

9. A method of chilling a carcass as defined in claims 6 or 8 wherein the cryogenic fluid is liquid nitrogen.

10. A method of chilling a carcass as defined in claim 1 wherein the liquid is water.

11. A method of chilling a carcass as defined in claim 1 or 10 wherein the ice layer is approximatel equal to 1% of the weight of the carcass.

12. A method of chilling a carcass as defined in claim 1 wherein the further period of cooling of the carcass is between 10 and 15 minutes.

13. A method of chilling a carcass as defined in claims 1, 6 or 12 wherein the further period of cooling of the carcass is with a cryogenic fluid.

14. A method of chilling a carcass as defined in claims 1 or 6, 13 wherein the entire chilling process takes between 10 and 20 minutes.

15. A method of chilling a carcass as defined in claim 1 wherein the ice layer is substantially melted by the end of the cooling period.

16. A method of chilling a carcass as defined in claim 1 wherein the carcass is a poultry carcass.

* * * * *